UNITED STATES PATENT OFFICE 1,987,227

MAKING ALKYLENE CHLOROHYDRINS AND ALIPHATIC ESTERS CONJOINTLY

Edgar C. Britton, Gerald H. Coleman, and Garnett V. Moore, Midland, Mich., assignors to The Dow Chemical Company, Midland, Mich., a corporation of Michigan No Drawing. Application July 17, 1933, Serial No. 680,784

5 Claims. (Cl. 260—106)

The invention regards a process for making an alkylene chlorohydrin and an ester of a saturated aliphatic mono-carboxylic acid by reacting an alkylene glycol diester of a saturated aliphatic mono-carboxylic acid with hydrogen chloride and a primary or secondary aliphatic alcohol or aralkyl alcohol. The following description sets forth in detail several approved modes of carrying out the invention, such disclosed modes illustrating, however, but several of various ways in which the principle of the invention may be used.

The following equation illustrates the reaction involved in our invention:—

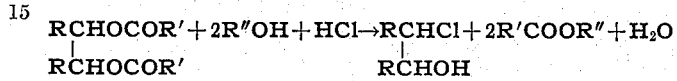

wherein R represents either hydrogen or an alkyl group; R' represents an alkyl group; and R" represents either a primary or secondary alkyl group, or an aralkyl group.

To show the results obtained by practicing our invention, the following examples are given:

Example 1

A mixture consisting of 9.5 mols of ethylene glycol diacetate and 30 mols of 96 per cent ethyl alcohol was saturated with 9.7 mols of gaseous hydrogen chloride. This mixture was then placed in a copper-lined bomb, agitated, and maintained at a temperature of 125°–135° C. for two hours. The reaction mixture was then removed from the bomb and fractionally distilled. The approximate yields obtained were: ethylene chlorohydrin—78 per cent of theoretical; and ethyl acetate—89 per cent of theoretical.

Example 2

A mixture consisting of 10 mols of ethylene glycol diacetate and 25 mols of secondary butyl alcohol was saturated with 10 mols of gaseous hydrogen chloride. This mixture was heated for two hours at a temperature of about 150° C. in a copper-lined bomb. The reaction mixture was removed from the bomb and fractionally distilled, the yields obtained being approximately: ethylene chlorohydrin—70 per cent of theoretical; and secondary butyl acetate—82 per cent of theoretical.

Example 3

A mixture consisting of 4.94 mols of propylene glycol diacetate and 12.35 mols of normal-butyl alcohol was saturated with 5.15 mols of gaseous hydrogen chloride. The mixture was then placed in a copper-lined rocker bomb and maintained at a temperature of 150° C. for three hours. The reaction mixture was then removed from the bomb and fractionally distilled. The approximate yields obtained were: propylene chlorohydrin—80 per cent of theoretical; and normal-butyl acetate—81 per cent of theoretical.

Example 4

A mixture consisting of 1 mol of ethylene glycol dipropionate, 2.5 mols of normal-propyl alcohol, and 1 mol of hydrogen chloride was maintained at refluxing temperature for 5 hours. The reaction mixture was then fractionally distilled to obtain an approximate yield of 75 per cent of theoretical of normal-propyl propionate and 72 per cent of ethylene chlorohydrin.

We have used the aralkyl alcohols, such as benzyl alcohol and phenyl ethyl alcohol in carrying out the foregoing process. We have been unable to use a tertiary aliphatic alcohol due to decomposition thereof under reaction conditions.

It is to be noted that the boiling points of certain of the chlorohydrins and esters are so close together that mixtures thereof are very difficult to separate, and, unless it is desired to utilize the reaction mixture as a solvent without separating the various components thereof, care must be exercised in selecting an alcohol which will yield an ester with a boiling point somewhat removed from that of the chlorohydrin conjointly obtained. The reaction is preferably run in an excess of alcohol, and the resulting reaction mixture containing chlorohydrin, ester, and excess alcohol is an excellent lacquer solvent.

In conclusion, our process provides an advantageous method for making a substantially anhydrous alkylene chlorohydrin and an ester of a saturated aliphatic mono-carboxylic acid conjointly.

Other modes of applying the principle of our invention may be employed instead of those explained, change being made as regards the process herein disclosed, provided the step or steps stated by any of the following claims or the equivalent of such stated step or steps be employed.

We therefore particularly point out and distinctly claim as our invention:—

1. The method which comprises reacting an alkylene glycol diester of a saturated aliphatic mono-carboxylic acid with hydrogen chloride and an alcohol selected from the class consisting of primary and secondary alkyl and aralkyl alcohols to form an alkylene chlorohydrin and an ester of the alcohol and said aliphatic mono-carboxylic acid.

2. The method which comprises subjecting a mixture of an alkylene glycol diester of a saturated aliphatic mono-carboxylic acid, hydrogen chloride, and an alcohol selected from the class consisting of primary and secondary alkyl and aralkyl alcohols to a temperature above about 50° C. whereby an alkylene chlorohydrin and an ester of the alcohol and said aliphatic mono-carboxylic acid are formed.

3. The method which comprises reacting an alkylene glycol diester of a saturated aliphatic mono-carboxylic acid with hydrogen chloride and an alcohol selected from the class consisting of primary and secondary alkyl and aralkyl alcohols at superatmospheric pressure and at a temperature above about 50° C. to form an alkylene chlorohydrin and an ester of the alcohol and said aliphatic mono-carboxylic acid.

4. The method which comprises heating an alkylene glycol diester of a saturated aliphatic mono-carboxylic acid with hydrogen chloride and an alcohol selected from the class consisting of primary and secondary alkyl and aralkyl alcohols at superatmospheric pressure to a temperature between about 125° and about 160° C. whereby an alkylene chlorohydrin and an ester of the alcohol and said aliphatic mono-carboxylic acid are formed.

5. A process for making ethylene chlorohydrin and ethyl acetate which comprises admixing ethylene glycol diacetate with hydrogen chloride and ethyl alcohol, heating the mixture under pressure at a temperature of 125°–135° C., and recovering ethylene chlorohydrin and ethyl acetate from the reaction mixture.

EDGAR C. BRITTON.
GERALD H. COLEMAN.
GARNETT V. MOORE.